US010163378B1

(12) United States Patent
McGrath et al.

(10) Patent No.: US 10,163,378 B1
(45) Date of Patent: Dec. 25, 2018

(54) MULTI-PANEL DISPLAY PROJECT BOARD WHOSE HEADER PANEL PIVOTS BETWEEN FOLD-IN AND FOLD-OUT ORIENTATIONS WITHOUT ANY NEED FOR A PIVOTABLE FOOTER OR PIVOTABLE BRACES

(71) Applicant: Royal Consumer Products LLC, Norwalk, CT (US)

(72) Inventors: Craig McGrath, Pawling, NY (US); Steven A. Schulman, Norwalk, CT (US)

(73) Assignee: Royal Consumer Products LLC, Norwalk, CT (US)

( * ) Notice: Subject to any disclaimer, the term of this patent is extended or adjusted under 35 U.S.C. 154(b) by 0 days.

(21) Appl. No.: 15/784,040

(22) Filed: Oct. 13, 2017

Related U.S. Application Data

(60) Provisional application No. 62/560,844, filed on Sep. 20, 2017.

(51) Int. Cl.
*G09B 29/04* (2006.01)
*G09F 15/00* (2006.01)

(52) U.S. Cl.
CPC ................................ *G09F 15/0062* (2013.01)

(58) Field of Classification Search
CPC ................................ G09B 29/02; G09B 29/04
USPC ..... 434/408, 413, 414, 428, 430; 40/124.09, 40/124.12, 124.14, 539, 610
See application file for complete search history.

(56) References Cited

U.S. PATENT DOCUMENTS

| | | | | |
|---|---|---|---|---|
| 4,759,520 A * | 7/1988 | Levine | A47G 5/00 | 160/114 |
| 5,293,705 A * | 3/1994 | Wood | G09F 15/0062 | 40/124.191 |
| 5,632,390 A * | 5/1997 | Podergois | A47F 5/116 | 211/149 |
| 5,911,522 A * | 6/1999 | Wood | G09F 15/0062 | 40/124.09 |
| 5,960,848 A * | 10/1999 | Schirer | G09F 15/0068 | 160/135 |
| 7,451,800 B2 * | 11/2008 | Johnson | G09F 15/0068 | 160/135 |
| 7,823,309 B2 * | 11/2010 | Albenda | A47B 96/202 | 206/736 |

(Continued)

OTHER PUBLICATIONS

Apollo Display Systems catalog, p. 197, ACCO Brands, 2006.

*Primary Examiner* — Kurt Fernstrom
(74) *Attorney, Agent, or Firm* — Robert J. Hess; Hess Patent Law Firm

(57) ABSTRACT

A multi-panel display project board with a center panel between two side panels and with a header panel movable between a fold-in position and a fold-out position. Each panel has a medium sandwiched between two linerboards. Creases between the panels are formed by slitting linerboard beneath the creases or by forming the creases each as a crushed score. The header panel has a long segment separated from two shorter segments by segment creases. When the header panel is in the fold-in position after pivoting from a fully folded orientation about panel creases, the shorter segments define respective obtuse angles with the long segment. In the fold-out position after pivoting the header panel about additional creases, the shorter segments define respective reflex angles instead. There is no footer or braces.

16 Claims, 10 Drawing Sheets

(56) References Cited

U.S. PATENT DOCUMENTS

| | | | | |
|---|---|---|---|---|
| 8,955,243 | B2 * | 2/2015 | Dashe | G09F 1/06 40/539 |
| 2005/0086842 | A1 | 4/2005 | Ternovits et al. | |
| 2006/0048421 | A1 * | 3/2006 | Oleksak | G09F 15/0068 40/610 |

* cited by examiner

MULTI-PANEL DISPLAY PROJECT BOARD WHOSE HEADER PANEL PIVOTS BETWEEN FOLD-IN AND FOLD-OUT ORIENTATIONS WITHOUT ANY NEED FOR A PIVOTABLE FOOTER OR PIVOTABLE BRACES

CROSS-REFERENCE TO RELATED APPLICATIONS

U.S. provisional patent application No. 62/560,844 filed Sep. 20, 2017 from which the present application claims the benefit of priority.

BACKGROUND OF THE INVENTION

1. Field of Endeavor to which the Invention Pertains

The invention pertains to a multi-panel display board that has a central panel separated from two adjoining side panels on either side by crease lines and is equipped with a header panel. The side panels pivot about panel creases from a fully folded orientation to obtuse angular orientations. The header panel pivots from a fold-in position to a fold-out position so that its segments move accordingly between obtuse angular orientations and reflex angular orientations.

2. Description of Information Known to the Inventor, Including References to Specific Documents Related to the Invention, and Specific Problems Involved in the State of Technology that the Invention is Drawn Toward Conventionally, a multi-panel display project board has a central panel and has side panels that may pivot about panel creases relative to the central panel. The panels are made of a single wallboard that has two linerboards that sandwich a medium, such as corrugated cardboard. One of the linerboards may be mottled white while the other is not. The central panel may be twice the width of each of the side panels, whose widths are substantially the same.

With the side panels pivoted into a fully folded orientation, the side panels lie upon the central panel and in effect cover it. When pivoted to a deployed position, the side panels spread apart by pivoting into obtuse angular orientations relative to the central panel.

Royal Consumer Products LLC commercializes just such a multi-panel display project board. It panel creases are formed by slitting the non-mottled linerboard to give rise to the panel creases. When the side panels are moved into their obtuse angular orientations upon a smooth, flat surface with the project board self-standing upright, the side panels remain in their obtuse angular orientations. A smooth, flat surface allows free movement of the side panels across it, which would not be the case if the surface were carpeted whose fibers may interfere with such free movement.

The mottled linerboard faces the front and the non-mottled linerboard faces the rear. The medium between the two linerboards may be corrugated cardboard, corrugated fiberboard or corrugated paperboard. The medium is corrugated with C flutes, which offer better cushioning properties than B flutes and is not as rigid.

On the other hand, Artskills Inc. commercializes its own project board but its panel creases are scored or crushed. Such panel creases impose forces on the side panels to pivot them back to acute angular orientations, thereby leaving the obtuse angular orientations. Therefore, after placing the project board upon a smooth, flat surface in a self-standing manner, a header panel is needed to keep the side panels apart at desired obtuse angular orientations by securing it to the tops of the side walls.

One problem with a detachable header panel is that since the multi-panel display board may be used without the header panel, the header panel may become misplaced when not in use so that when the multi-panel display board is used again, the header panel cannot be found. Another problem with a detachable header panel has to do with aesthetics since the header panel is torn off from the side panel via perforations and thus perforation residue is left behind that the user may need to remove to leave a clean edge surface. There is also the risk of tearing regions away from the perforations inadvertently if a tearing force is directed other than along the perforations.

US published patent application no. 2005/0086842 discloses a portable display device and method of setting up the portable display device. The display device includes two panels that can fold inwardly relative to each other by pivoting about side hinge lines. The side hinge lines include a cut extending through either the front or rear surface of the first panel. However, the side hinge lines may include a deformed area (also known as a crush score) that does not include any cuts. The panels may be made of corrugated cardboard, reinforced paper, plastic, wood, corkboard, or chalkboard. There is a marquee surface integral with the display device that extends outwardly from the two panels by pivoting about a further two hinge lines. The further two hinge lines include a crush score, although they could also include a cut through one of the front or rear surfaces.

There is also a pivotable footer that pivots about a crush score line and is integral with the display device and in effect defines a bottom edge of the central panel. A portion of the side hinge lines include a cut through both the front and rear surfaces of the two side panels to allow the footer to project away from the display device. The footer projects away from the bottom of the display device to provide both support for the display device and to provide another featured display area.

There are two bottom braces that are integral with and pivotally coupled to the two side panels via lower hinge lines that include a crush score to further increase the stability of the display device when it is set up. The two bottom braces each extend in planes that intersect with the planes that the two side panels extend respectively.

Generally, the footer will extend away from the display device in one direction and the bottom braces will extend away from the display device in the opposite direction as this arrangement provides the most support for the display device.

A drawback to the portable display device of US published patent application no. 2005/0086842 is the need for support from the footer and the braces for stability of the portable display device so as to keep the side panels spread apart. It would be preferable to do without and yet retain the side panels in their spread apart orientation at respective obtuse angles relative to the central panel so as to avoid the need to make provision for such a footer and braces.

It is desired to reconfigure the multi-panel display panel with the header panel permanently attached to the multi-panel display board yet without any pivotable footer or pivotable braces.

BRIEF SUMMARY OF THE INVENTION

One aspect of the invention resides in a blank and a method of folding portions of the blank into a multi-panel display project board.

The multi-panel project board has a plurality of panels that include a central panel, two side panels and a header panel. The header panel has a plurality of segments that include a long segment and two shorter segments. Each of the panels is formed of a single wallboard that has a medium between two linerboards. The medium is either corrugated cardboard, corrugated fiberboard, corrugated paperboard, foam core or cork core. The two linerboards include an non-mottled linerboard and a mottled linerboard. The mottled linerboard may be any conventional model white liner board, whether from bleached pulp or white grades of recycled fiber. For example, GP Harmon is one supplier of a mottled white top linerboard for which the top ply (approximately 20 percent) on a white top sheet is made from bleached pulp or white grades of recycled fiber.

To deploy, the side panels are pivoted relative to the central board about respective panel creases between a fully folded orientation and a spread-apart deployed orientation. The two side panels and the central panel define respective angles of inclination for the spread apart deployed orientation that are obtuse angles of inclination.

The angles of inclination are retained for the spread-apart deployed orientation as the obtuse angles of inclination even upon a smooth, flat surface without further support to keep the side panels spread apart. The retention arises because of a configuration of the two panel creases and because of a bottom edge of the two side panels and of the central panel are in alignment with each other.

BRIEF DESCRIPTION OF THE SEVERAL VIEWS OF THE DRAWINGS

For a better understanding of the present invention, reference is made to the following description and accompanying drawings, while the scope of the invention is set forth in the appended claims.

FIG. 8 is an isometric view of an upper corner region of the display project board of FIGS. 6 and 7 but in a self-standing upright position with the side panels swung out from the central panel and with the header panel folded in.

DETAILED DESCRIPTION OF THE INVENTION

Figure 1:
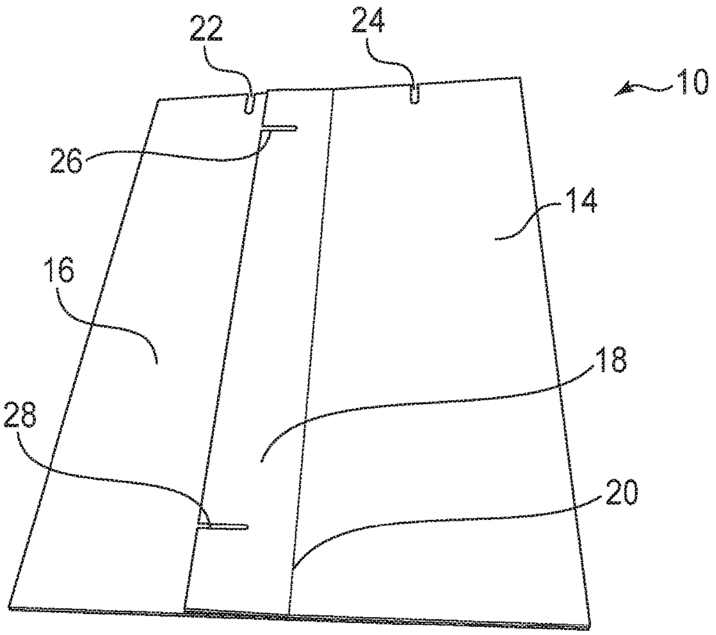
FIG. 1 (PRIOR ART)
FIG. 1 is an isometric top view of a conventional display project board in a folded state with rear sides facing out.
Figure 2:
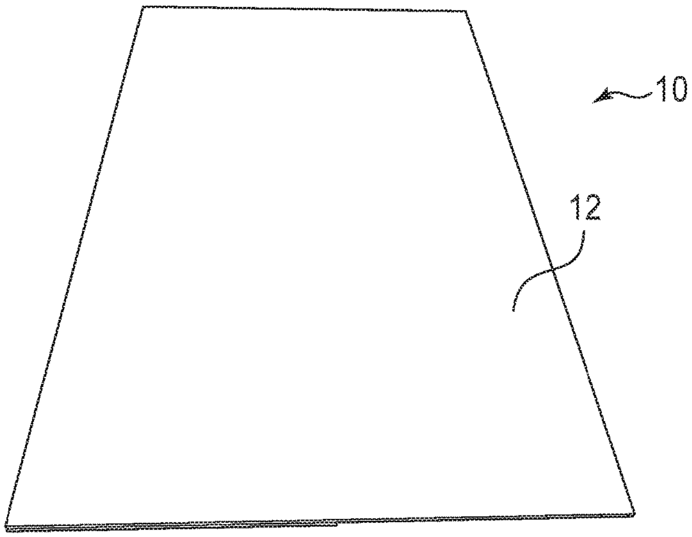
FIG. 2 (PRIOR ART)
FIG. 2 is an isometric bottom view of the conventional display project board in the folded state of FIG. 1 with rear sides facing out.
Figure 3:
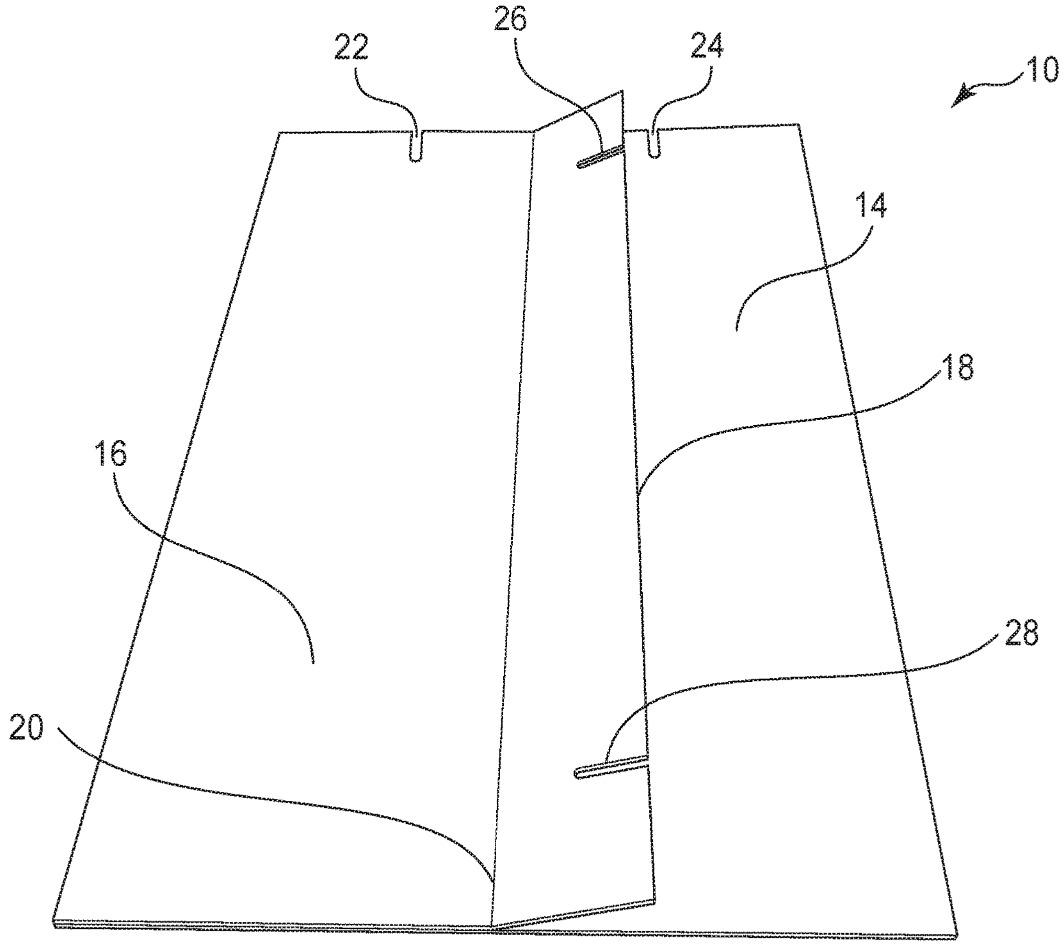
FIG. 3 (PRIOR ART)
FIG. 3 is an isometric top view as in FIG. 1 but with the header panel partially folded back to show its front side.
Figure 4:
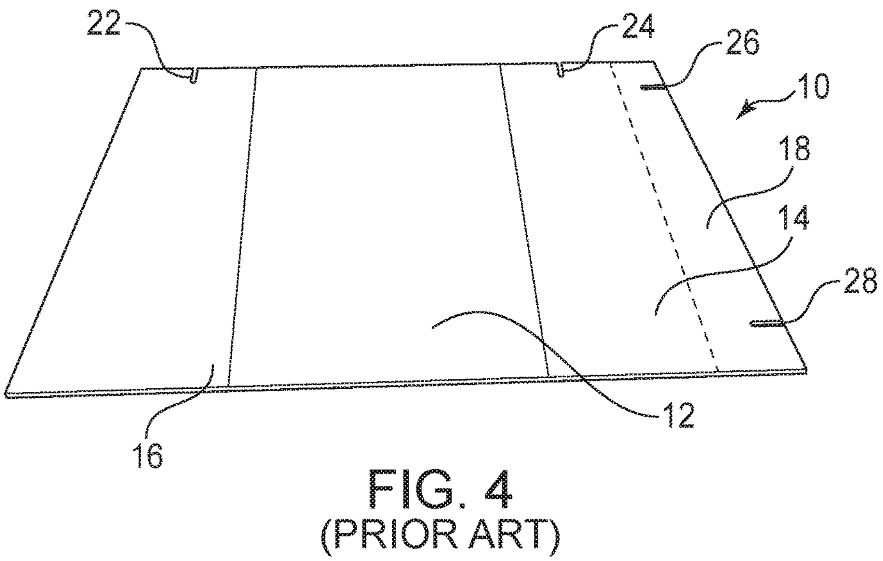
FIG. 4 (PRIOR ART)
FIG. 4 is an isometric front side view of the conventional display project board of FIGS. 1, 2 and 3 but in a flattened state.
Figure 5:
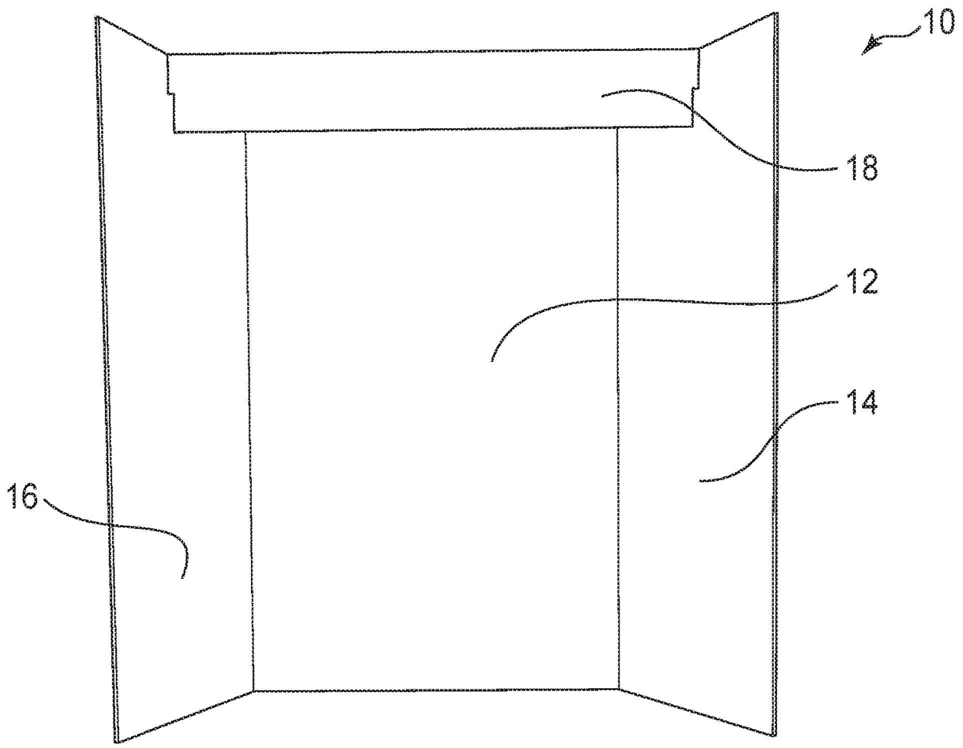
FIG. 5 (PRIOR ART)
FIG. 5 is an isometric view of the conventional display project board of FIGS. 1-4 in a self-standing upright position with the header panel torn off from a side panel and secured into the top edges of the side panels.

Turning to the drawings, FIGS. 1-5 show progressive views for assembly of a conventional multi-panel display project board 10 with a central panel 12, two side panels 14, 16 and a header panel 18 all commercialized together by Royal Consumer Products LLC. The display project board 10 is shipped in a folded state as shown in FIGS. 1 and 2. When unfolded fully, the display project board 10 takes on a planar flattened shape as shown in FIG. 3. As shown in FIG. 4, a header panel 18 is attached to one of the side panels 14, 16 via perforations 20 and may be bent and severed along the perforations 20 to separate the header panel 18 from the rest of the multi-panel display project board. The central panel 12 separates two side panels 14, 16 by respective creases 22, 24. When the multi-panel display project board 10 is erected in the manner of FIG. 5 by swinging out its two side panels 14, 16 in the same direction relative to the central panel 12 to respective oblique angles, the header panel 18 may be fitted to the top edge of each of the side panels 14, 16 via a pair a slots or slits 26, 28 that complement corresponding slots or slits 30, 32 in the top edges of the two side panels 14, 16.

Figure 6:
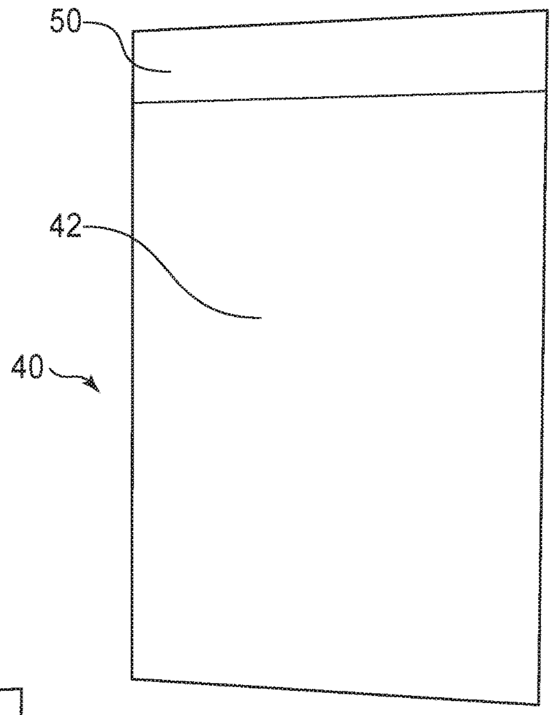
FIG. 6 is an isometric bottom view of a display project board in a folded state with rear sides facing out in accordance with the invention.
Figure 7:
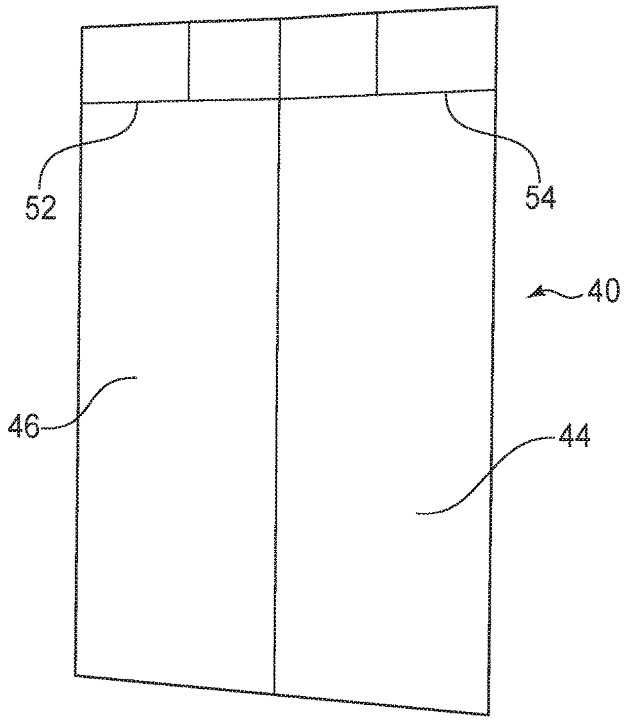
FIG. 7 is an isometric top view of a display project board in a folded state with rear sides facing out in accordance with the invention.
Figure 8:
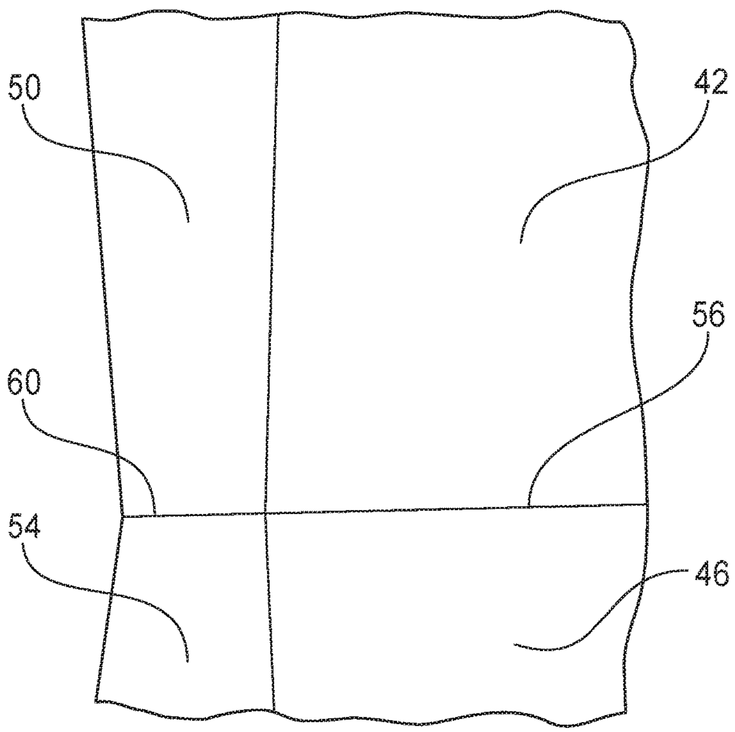
Figure 9:
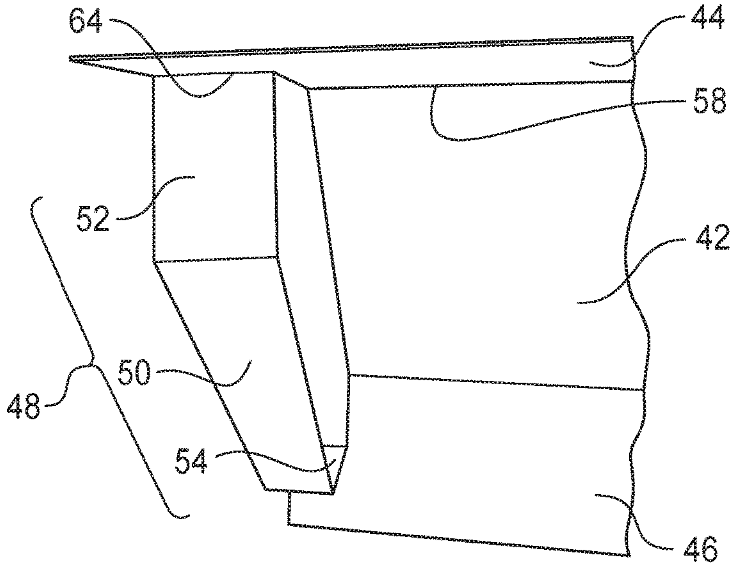
FIG. 9 is an isometric view as in FIG. 8, but with the header panel folded out.

FIGS. 6-7 show a multi-panel project display board 40 in a folded state in accordance with the invention that has a central panel 42 between two side panels 44, 46 and has a fold-out header panel 48, which has a long segment 50 between two shorter segments 52, 54.

The multi-panel display project board 40 is a multi-panel board that may be unfolded from the folded state of FIGS. 6-7 into the deployed state of FIGS. 8-12. In doing so, the side panels 44, 46 are pivoted about panel creases 56, 58 between the side panels 44, 46 and the central panel 42 so as to extend at respective oblique angles relative to the central panel 42. Further, the fold-out header panel 48 is moved from a fold-in position of FIG. 8 to a fold-out position of FIG. 9. In doing so, the shorter segments 52, 54 are pivoted about associated ones of additional creases 64, 66, which are between ends of associated shorter segments 52, 54 and the two side panels 44, 46 about midway along the lengths of the two side panels 44, 46. As a consequence of such pivoting, the angles of inclination between the long segment 50 and the shorter segments 52, 54 changed from obtuse (between 90 and 180 degrees) to reflex (greater than 180 degrees) as the fold-out header panel 48 moves from the fold-in position to the fold-out position.

Figure 10:
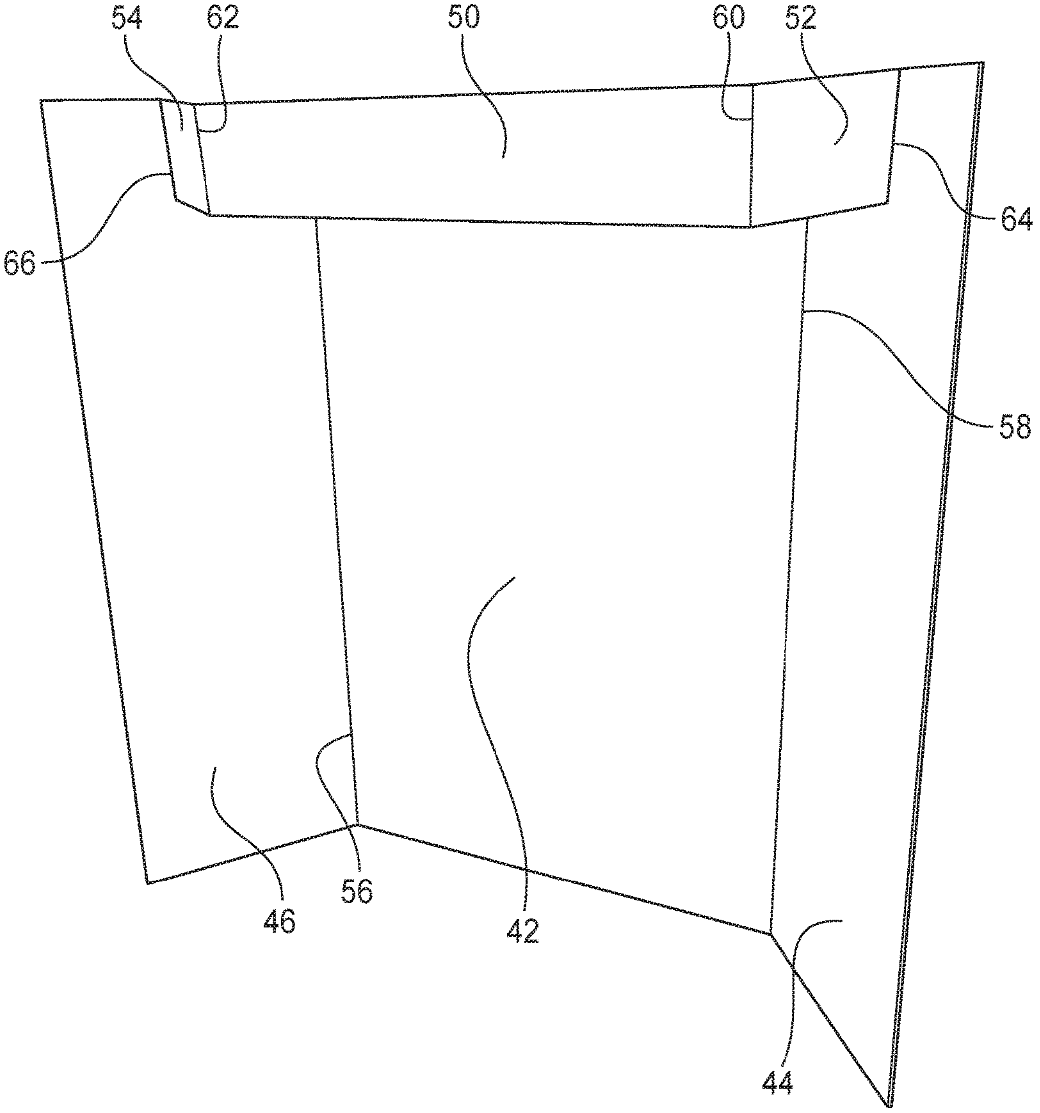
FIG. 10 is an isometric front view of the project board of FIG. 9 in a self-standing upright position with the header in a fold-out position.
Figure 11:
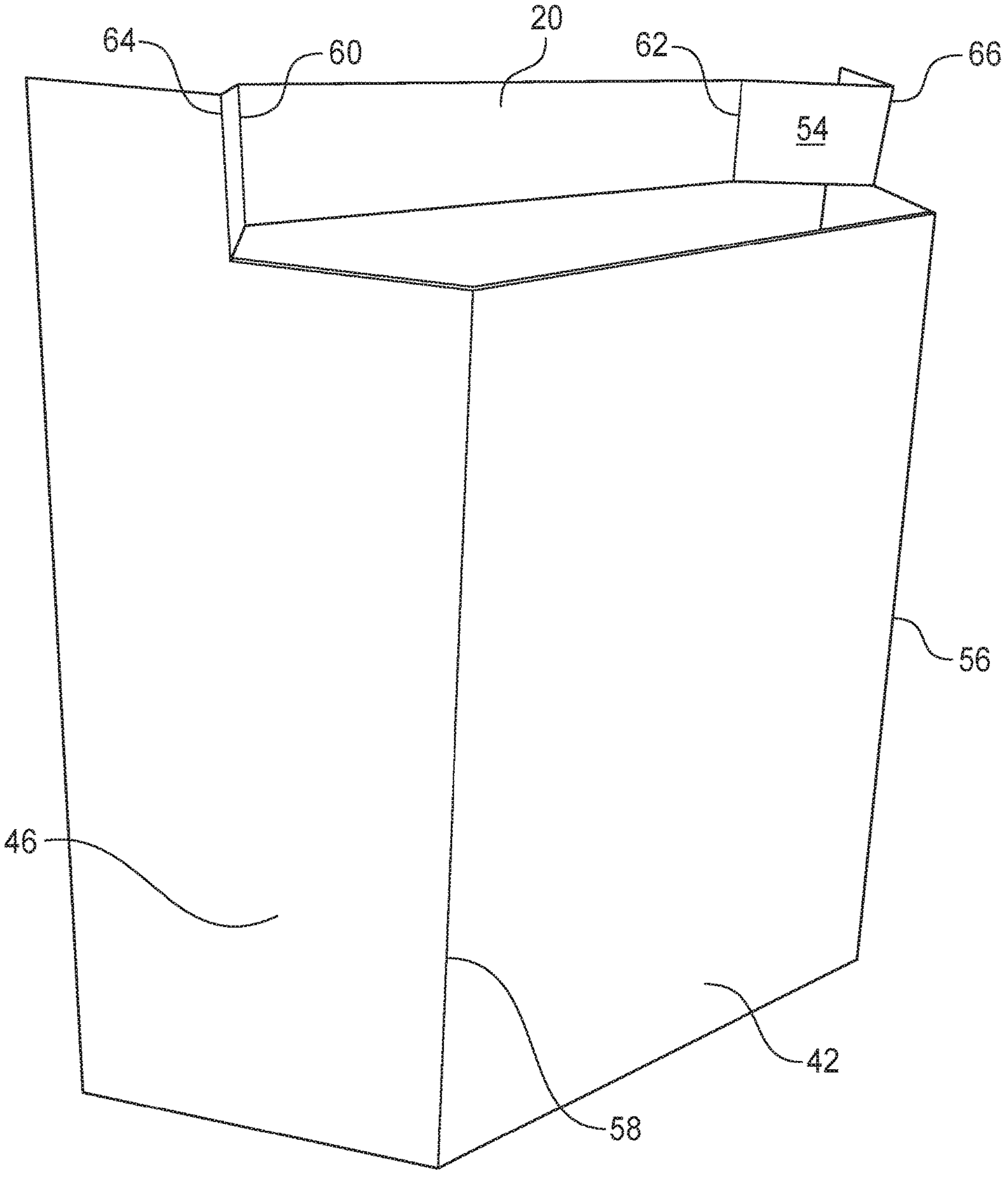
FIG. 11 is an isometric rear view of the project board of FIGS. 9 and 10.
Figure 12:
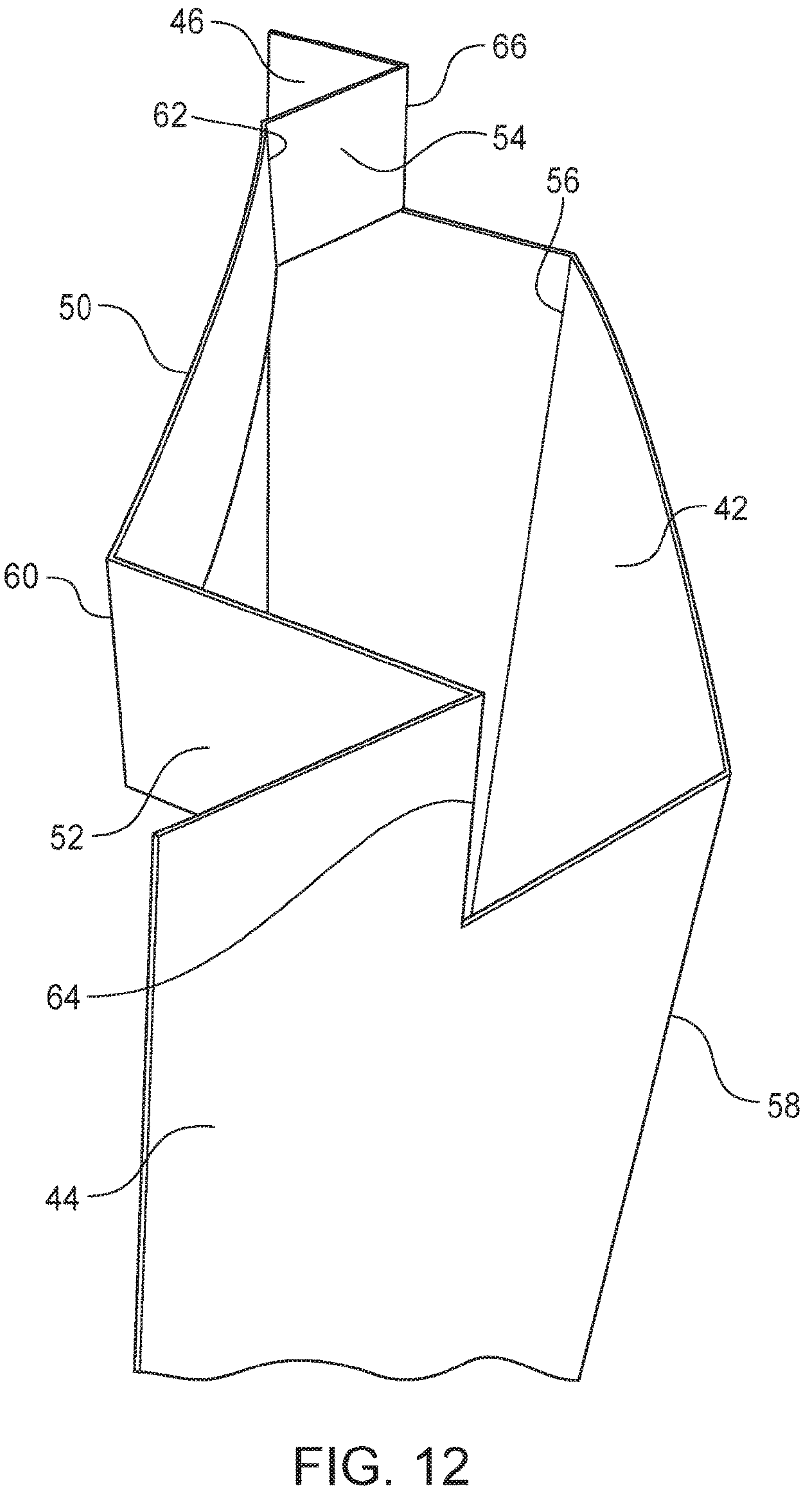
FIG. 12 is an isometric top view of the project board of FIGS. 8-10.

FIGS. 10-12 show various views of the multi-panel display project board 40 in a self-standing upright state with its fold-out header panel 48 in its fold-out position in accordance with the invention. The central panel 42 has a width between the panel creases 56, 58 that is wider than either of the widths of the adjoining side panels 44, 46. Preferably, the widths of the side panels 44, 46 are substantially the same so that the width of the central panel is substantially twice that of the side panel width. The fold-out header panel 48 defines a length between the two additional creases 64, 66 that is longer than the central panel width. However, the length of the long segment 50 between the two segment creases 60, 62 is substantially the same as the center panel width. Each of the shorter segments 52, 54 define a respective length that is substantially one quarter that of the length of the long segment 50.

The side panels 44, 46 of the multi-panel board of the invention are foldable between a fully folded orientation and their obtuse angular orientation so that in the fully folded position, the two side panels 44, 46 fold over respective ones of the panel creases 56, 58 to lie over the central panel 42. Also, the two shorter segments 52, 54 fold over the respective ones of the segment creases 60, 62 to lie over the long segment 50. In the obtuse angular orientation, the side panels 44, 46 each are oriented at respective obtuse angles relative to the central panel 42.

The fold-out header panel 48 is foldable from a fold-in position and a fold-out position so that in the fold-in position, the long segment 50 is in alignment with the central panel 42 and in the fold-out position, the long segment 50 is further away from the central panel 42 than are the shorter segments 52, 54 from the central panel 42.

In the fold-in position for the fold-out header panel 48, the segment creases 60, 62 likewise define the same orientations as that of the side panels 44, 46. That is, the fold-in position is movable between the fully folded orientation and the obtuse angular orientation similar to that for the side panels 44, 46. However, the fold-out header panel 48 is also movable from the fold-in position to a fold-out position. In the fold-out position, the shorter segments 52, 54 have a reflex angular orientation instead of the obtuse angular orientation they had in the fold-in position just prior to being pivoted about the additional creases 64, 66.

Preferably, when fold-out header panel 48 moves between the fold-in and fold-out positions, no bend arises in the long segment 50 because of the construction of the multi-panel display project board 40.

Figure 13:
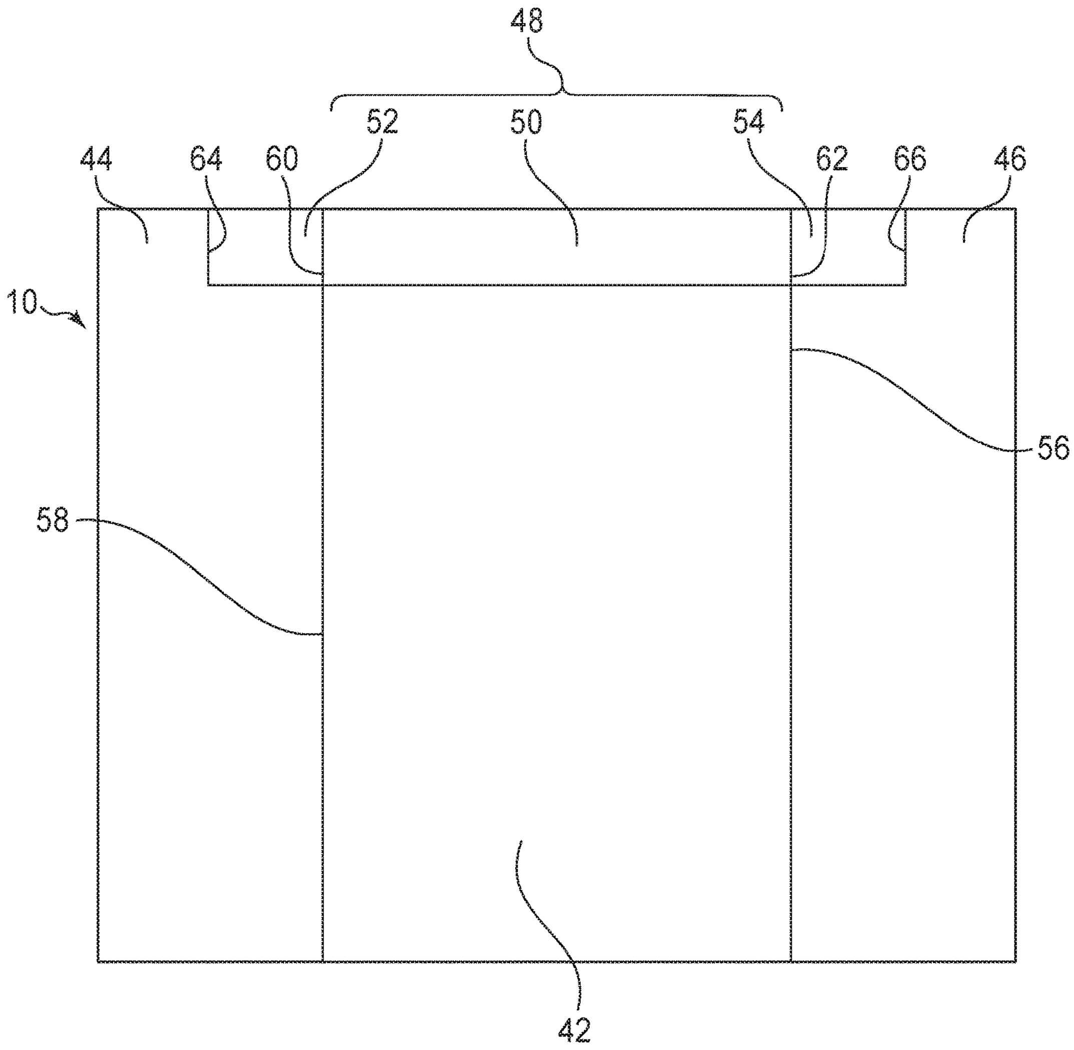
FIG. 13 is a top view of a blank in accordance with the invention.

FIG. 13 shows a blank in accordance with the invention. The panels of the multi-panel display project board 40 may be made of the same single wallboard construction as that of the conventional multi-panel display project board 10. For instance, the single wallboard construction may be that of a medium sandwiched between two linerboards, with the medium being fluted or corrugated, such as corrugated paperboard, corrugated fiberboard, or corrugated cardboard, or a core such as that of a foam core found in a conventional foam board or cork core found in a conventional cork board. If corrugated, a C flute corrugation is preferred over a B flute corrugation, although a B flute corrugation is viable. Preferably, one of the linerboards is mottled and the other is non-mottled. The non-mottled linerboard is slit behind where the creases will form and the slits each penetrate an entirety of the non-mottled linerboard and preferably the medium between the linerboards, but does not penetrate the mottled linerboard.

Figure 14:
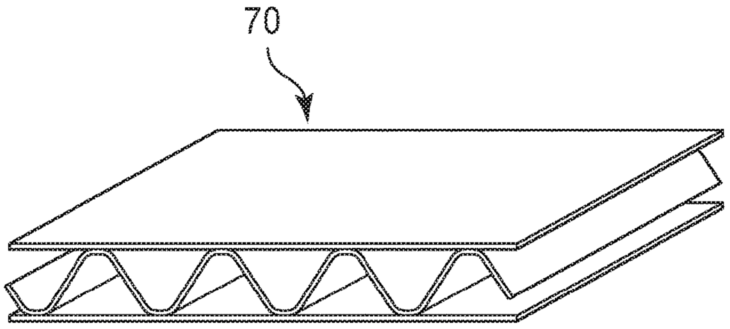
FIG. 14 (PRIOR ART)
FIG. 14 is an isometric view of a conventional single wallboard having a corrugated medium sandwiched between two linerboards.
Figure 15:
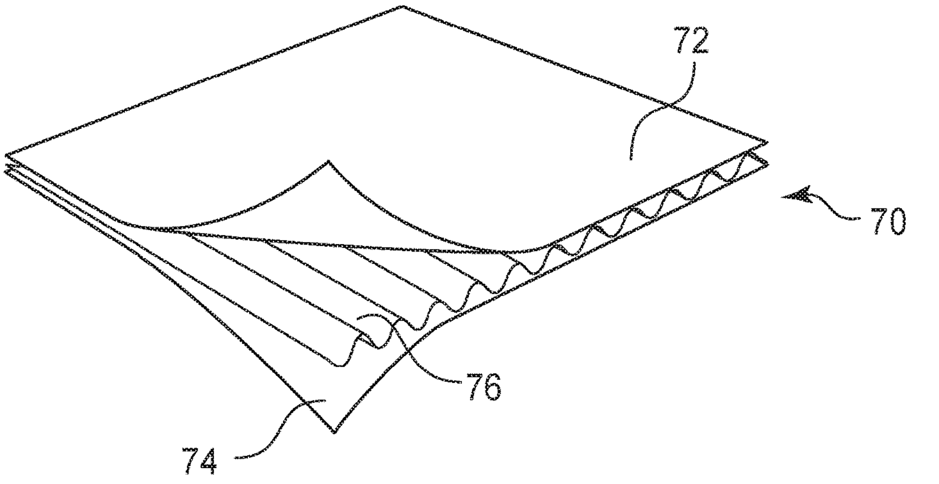
FIG. 15 (PRIOR ART)
FIG. 15 is an isometric view of the conventional single wallboard of FIG. 13 with a corner edge spread apart.

FIGS. 14 and 15 show a conventional single wallboard 70 having a top outer ply surface and a bottom outer ply surface that may be two sheets of linerboard. Between the top and bottom outer ply surfaces may be glued the fluted or corrugated medium or the foam core medium.

A conventional corrugator is a large machine, made up of a series of smaller machines, which combines two different kinds of paper to create cut sheets of corrugated fiberboard. The flat, facing sheets are referred to as the liners, and the wave-like, fluted layers are known as the corrugating medium, or simply medium.

As concerns foamboard, the subject matter from U.S. patent application publication no. US 2011/0239,505 A1 and US patent application publication no. US 2012/0251816 A1 are incorporated herein by reference both of which being filed on behalf of Royal Consumer Products LLC. The former patent application mentions a multi-panel display has at least two foamboard panels with a foam core and outer layers, and a web hinge connecting adjacent foamboard panels. The latter patent mentions a multi-layer construction of foamboard that has high integrity and durability because it addresses the problem of paper that can separate from the foam core, particularly at the corners.

If desired, the web hinges may be dispensed with in accordance with the invention and instead creases may be formed by slitting one of the liner panels and cutting through the foam core. If desired, a cork core may be substituted for the foam core.

While the foregoing description and drawings represent the preferred embodiments of the present invention, various changes and modifications made be made without departing from the scope of the present invention.

What is claimed is:

1. A multi-panel display project board blank, comprising:

a plurality of panels that include a central panel, two side panels and a header panel, the header panel having a plurality of segments that include a long segment and two shorter segments, each of the panels being formed of a single wallboard that has a medium between two linerboards, the medium being selected from the group consisting of corrugated cardboard, corrugated fiberboard, corrugated paperboard, foam core and cork core, the two linerboards including an non-mottled linerboard and a mottled linerboard, the plurality of panels each having planar surfaces; and a plurality of creases including two panel creases between the central panel and respective ones of the two side panels, two segment creases between the long segment and respective ones of the shorter segments, and two additional creases, one of the additional creases between one of the side panels and one of the shorter segments, a remaining one of the additional creases between a remaining one of the side panels and a remaining one of the shorter segments;

wherein:

the plurality of panels and the plurality of creases together form a multi-panel board that constitutes the multi-panel display project board blank, the central panel and the two side panels have respective bottom edges in alignment with each other, one of the side panels and one of the shorter segments are configured to pivot in unison between fully folded and fully deployed orientations, a remaining one of the side panels and a remaining one of the shorter segments are configured to pivot in unison between the fully folded and the fully deployed orientations, the two side panels overlay the central panel in the fully folded orientations and the two panels are spread apart from each other in the fully deployed orientations, the two side panels and the central panel define respective oblique angles between them in the fully deployed orientations, the two shorter segments overlay the long segment in the fully folded orientation and spread apart from each other in the fully deployed orientations, the two shorter panels and the long panel define respective obtuse angles between them in the fully deployed orientations, the header panel is configured to pivot about the two additional creases between a fold-in position and a fold-out position so that the long segment and the two shorter segments define respective angles of inclination between them for the fold-in position and for the fold-out position, the respective angles of inclination for the fold-in position being obtuse angles of inclination and the respective angles of inclination for the fold-out position being reflex angles of inclination, and the multi-panel board lacks any pivotable footer that defines the respective bottom edge of the central panel and lacks any braces that extend from the respective bottom edges of the two side panels within respective planes that differ from respective planes within which extend the planar surfaces of the two side panels, the multi-panel board remaining stable in a self-standing and erect orientation upon a smooth, flat surface with the side panels in the fully deployed orientation and the two shorter segments in the fold-out position.

2. The blank of claim 1, wherein the central panel defines a width between the respective panel creases that is longer than widths of each of the side panels, the two side panels having respective widths that are substantially identical.

3. The blank of claim 1, wherein the central panel has a width that extends between the respective panel creases that is shorter than a length of the header panel that extends between the additional creases.

4. The blank of claim 1, wherein the multi-panel board lacks any perforations, the multi-panel board lacks any slots extending from edges of any of the panels, the header panel having a lengthwise edge cut that extends an entire width of the center panel and substantially midway of each of the side panels.

5. The blank of claim 1, wherein each of the side panels has a respective width extending from an adjacent one of the panel creases to an associated free end of the side panels, the respective additional creases being substantially midway along the respective widths of the side panels.

6. The blank of claim 1, wherein each of the shorter segments has a substantially identical respective length, each substantially identical respective length being defined between an associated pair of the segment and additional creases, the long segment having a length between the segment creases that is substantially four times longer than the substantially identical respective length of each of the shorter segments and that is substantially identical to a length of the central panel defined between the respective panel creases.

7. The blank of claim 1, wherein the mottled linerboard has a portion made from material selected from the group consisting of bleached pulp and white grades of recycled fiber.

8. The blank of claim 1, wherein in the fully folded orientation, the two side panels are folded over respective ones of the panel creases to lie over the central panel and the two shorter segments are folded over the respective ones of the segment creases to lie over the long segment greater then ninety degrees relative to a flat surface of the central panel.

9. The blank of claim 1, wherein the plurality of creases are each selected from a group consisting of a crushed score, a slit through the non-mottled linerboard, a slit through the mottled linerboard, a combination of slits through the non-mottled linerboard and through the medium, and a combination of slits through the mottled linerboard and through the medium.

10. The blank of claim 1, wherein the header panel is formed so that as the header panel move between the fold-in and fold-out positions, no bend arises in the long segment at least in part because of a construction of the multi-panel display project board that resists such a bend from arising.

11. The blank of claim 1, wherein the medium has a C-fluted corrugation and the mottled linerboard is a white top linerboard.

12. A method of folding panels of a multi-panel display project board blank, comprising:

pivoting one of two side panels about panel creases with respect to a central panel between fully folded and fully deployed orientations in unison with one of two shorter segments of a header panel about segment creases with respect to a long segment of the header panel between the fully folded and the fully deployed orientations, pivoting a remaining one of the two side panels about panel creases with respect to a central panel between fully folded and fully deployed orientations in unison with a remaining one of the two shorter segments of the header panel about segment creases with respect to the long segment between the fully folded and the fully deployed orientations, each of the central panel, two side panels and the header panel all having respective planar surfaces and being part of a multi-panel board that constitutes a multi-panel project board blank;

pivoting the header panel about two additional creases between a fold-in position and a fold-out position so that the long segment and the two shorter segments define respective angles of inclination between them for the fold-in position and for the fold-out position, the respective angles of inclination for the fold-in position being obtuse angles of inclination and the respective angles of inclination for the fold-out position being reflex angles of inclination, wherein:

the central panel and the two side panels have respective bottom edges in alignment with each other, the two side panels overlay the central panel in the fully folded orientations and the two panels are spread apart from each other in the fully deployed orientations, the two shorter segments overlay the long segment in the fully folded orientation and spread apart from each other in the fully deployed orientations, the central panel is between the side panels and separated from the side panels by the respective panel creases, the long segment is between the shorter segments and separated from the shorter segments by the respective segment creases, one of the shorter segments is separated from one of the side panels by one of the respective additional creases, another of the shorter segments is separated from another of the side panels by another of the respective additional creases, each of the panels being formed of a single wallboard that has a medium between two linerboards, the medium being selected from the group consisting of corrugated cardboard, corrugated fiberboard, corrugated paperboard, foam core and cork core, one of the two linerboards being non-mottled and another of the two linerboards being mottled, and the multi-panel board lacks any pivotable footer that defines the respective bottom edge of the central panel and lacks any braces that extend from the respective bottom edges of the two side panels in respective planes that differ from respective planes in which extend the respective planar surfaced of the two side panels, the multi-panel board remaining stable in a self-standing and erect orientation upon a smooth, flat surface with the side panels in the fully deployed orientation and the shorter segments in the fold-out orientation.

13. The method of claim 12, wherein in the fully folded orientation, the two side panels are folded over respective ones of the panel creases to lie over the central panel and the two shorter segments are folded over the respective ones of the segment creases to lie over the long segment.

14. The method of claim 12, further comprising the step of:

selecting each of the two panel creases, two segment crease and two additional creases from a group consisting of a crushed score, a slit through the non-mottled linerboard, a slit through the mottled linerboard, a combination of slits through the non-mottled linerboard and through the medium, and a combination of slits through the mottled linerboard and through the medium.

15. The method of claim 12, wherein the pivoting of the header panel between the fold-in and fold-out positions occurs in a manner such that no bend arises in the long segment at least in part because of a construction of the multi-panel display project board that resists such a bend from arising.

16. The method of claim 12, wherein the medium has a C-fluted corrugation and the mottled linerboard is a white top linerboard.

* * * * *